US006273445B1

(12) United States Patent
Garven, Jr.

(10) Patent No.: US 6,273,445 B1
(45) Date of Patent: Aug. 14, 2001

(54) WHEEL MOUNTING ASSEMBLY AND WHEELCHAIR THEREWITH

(75) Inventor: Douglas M. Garven, Jr., Boulder, CO (US)

(73) Assignee: Sunrise Medical HHG Inc., Longmont, CO (US)

( * ) Notice: Subject to any disclaimer, the term of this patent is extended or adjusted under 35 U.S.C. 154(b) by 0 days.

(21) Appl. No.: 09/332,465

(22) Filed: Jun. 14, 1999

(51) Int. Cl.[7] ........ B62M 1/14
(52) U.S. Cl. ........ 280/304.1
(58) Field of Search ........ 280/250.1, 304.1

(56) References Cited

U.S. PATENT DOCUMENTS 5,409,247 * 4/1995 Robertson et al. ........ 280/250.1
5,593,173 * 1/1997 Williamson ........ 280/642
5,851,018 12/1998 Curran et al. ........ 280/250.1
6,027,132 * 2/2000 Robinson et al. ........ 280/250.1

* cited by examiner

*Primary Examiner*—Kevin Hurley
(74) *Attorney, Agent, or Firm*—MacMillan, Sobanski & Todd, LLC

(57) ABSTRACT

An apparatus for joining an axle tube to a wheelchair frame includes a body coupled to the wheelchair frame by a coupling. An opening in the outer surface of the body is shaped and dimensioned to receive a projection on the axle tube to form a joint between the axle tube and the body. Alternatively, a joint may be formed by an opening in the outer surface of the axle that is shaped and dimensioned to receive a projection on the body. A wheelchair having a pair of spaced side frames has a body coupled to each of the side frames. An opening in the outer surface of each body is shaped and dimensioned to receive a projection on an axle tube to form a joint between the axle tube and each body. A pair of wheels each has an axle received by the axle tube.

25 Claims, 7 Drawing Sheets

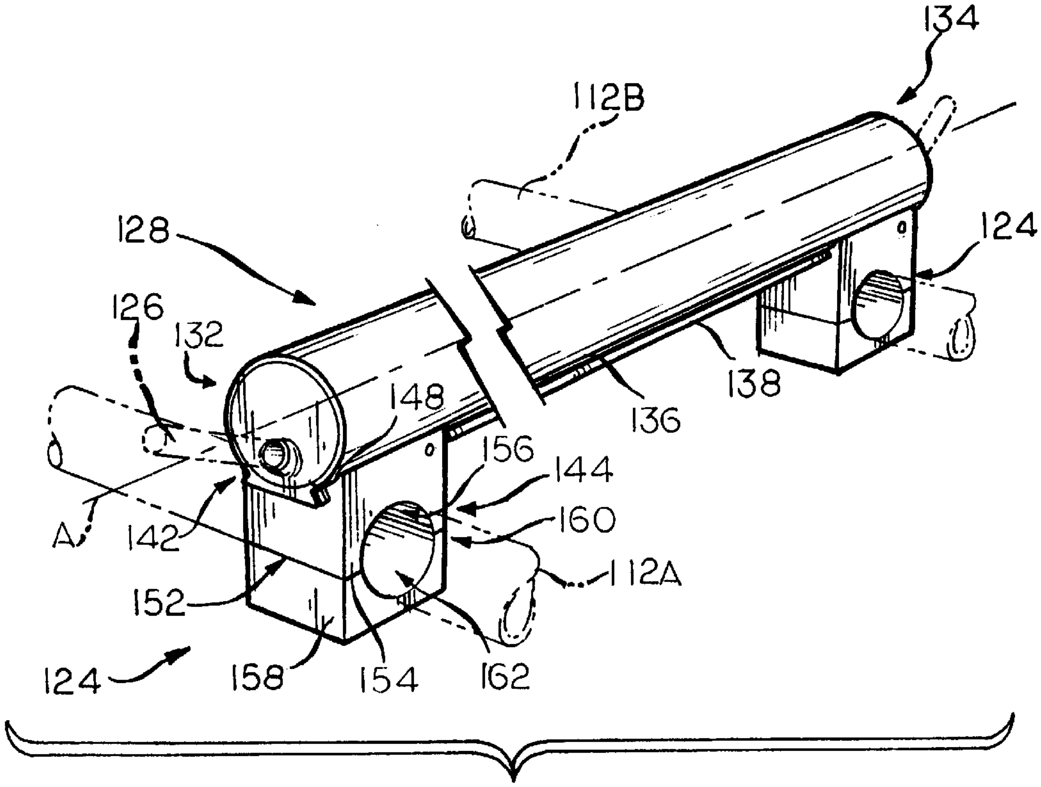
FIG. 2
FIG. 3
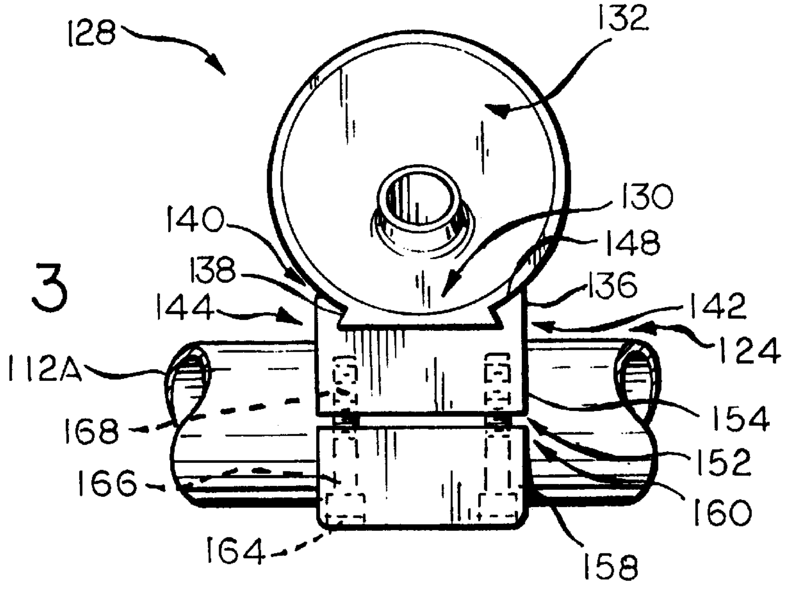

WHEEL MOUNTING ASSEMBLY AND WHEELCHAIR THEREWITH

BACKGROUND

Wheelchairs are typically relatively small, single-person conveyances that generally comprise a seat supported by side frames. The side frames are usually supported on a supporting surface by opposing front and rear wheels. The rear wheels may be supported by an axle that is engageable with a laterally extending axle tube. The axle tube may span between and traverse the opposing side frames. The ends of the axle tube may be attached to the side frames by a double clamp configuration. A suitable double clamp configuration typically includes a frame clamp and an axle tube clamp vertically spaced from the frame clamp. The frame clamp usually extends in a direction substantially perpendicular relative to a direction in which the axle tube clamp extends. The frame clamp generally comprises two components, which are attachable to one another. The axle tube clamp generally comprises a third component, which is attachable to one of the frame clamp components.

What is needed is a wheel mounting assembly which requires fewer components, and thus, is lighter and consumes less material, and hence, is more cost effective.

SUMMARY

The invention is directed to a wheel mounting assembly that satisfies the foregoing needs as well as other needs. The wheel mounting assembly includes a body coupled to the wheelchair frame by a coupling. An opening in the outer surface of the body is shaped and dimensioned to receive a projection on the axle tube to form a joint between the axle tube and the body. Alternatively, a joint may be formed by an opening in the outer surface of the axle tube that is shaped and dimensioned to receive a projection on the body. The invention is also directed to a wheelchair having a pair of spaced side frames and a body coupled to each of the side frames. An opening in the outer surface of each body is shaped and dimensioned to receive a projection on an axle tube to form a joint between the axle tube and each body. Each wheel of a pair of wheels has an axle received by the axle tube.

BRIEF DESCRIPTION OF THE DRAWINGS

FIG. 2 is an enlarged front and right side perspective view of the wheel mounting assembly shown in FIG. 1 and wheelchair side frames partially shown in phantom line.

FIG. 3 is a side elevational view of the wheel mounting assembly shown in FIG. 1 and a portion of a wheelchair side frame shown in full and holes and fasteners shown in hidden line.

DESCRIPTION

Figure 1:
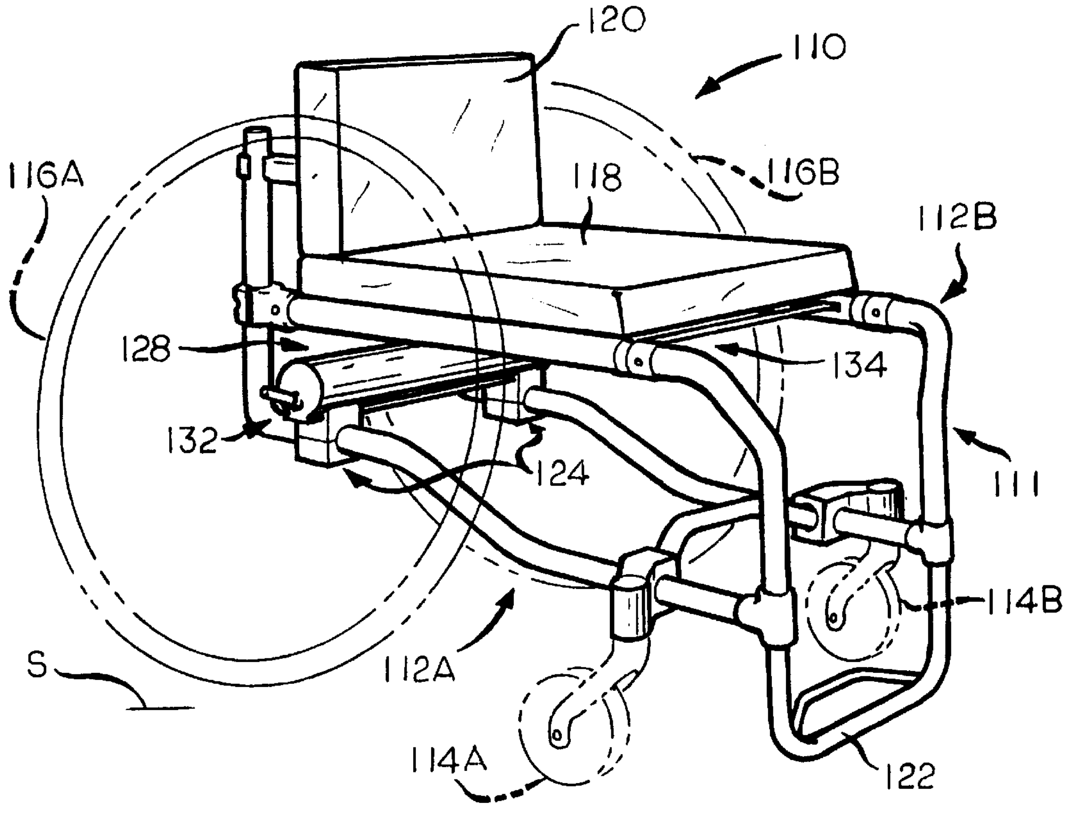
FIG. 1 is a front and right side perspective view of a wheel mounting assembly according to one embodiment of the invention and a wheelchair with front wheels shown in hidden line and rear wheels shown in phantom line.

Referring now to the drawings, there is illustrated in FIG. 1 a wheelchair 110 comprising wheelchair frame 111 including a pair of laterally spaced, longitudinally extending side frames 112A and 112B. "Longitudinally extending" in this context means that the side frames 112A and 112B are placed or running substantially lengthwise. The term "substantially" in this context and elsewhere throughout this description, and the claims that follow, may be broadly interpreted to mean exactly or something less than exactly. The term "lengthwise" is in reference to the length of the wheelchair 110 or the measurement of the extent of the wheelchair 110 along its greatest dimension, that is, from the front of the wheelchair 110 to the rear of the wheelchair 110. The side frames 112A and 112B are supported on a supporting surface S by front wheels 114A and 114B (shown in hidden line) and rear wheels 116A and 116B (shown in phantom line). A laterally extending, substantially horizontally disposed seat panel 118 and a laterally extending, substantially vertically disposed seat back 120 are supported or held in position by the side frames 112A and 112B. "Laterally extending" in this context means that the seat panel 118 and the seat back 120 are placed or running in a direction substantially transverse to the longitudinal direction, or from one side of the wheelchair 110 to the other side of the wheelchair 110. The seat panel 118 and seat back 120 are provided for bearing the weight of the wheelchair occupant (not shown). A footrest 122 may be disposed at the forward end of the wheelchair 110 for bearing the weight of the wheelchair occupant's feet.

Continuing with reference to FIG. 1, there is illustrated a mounting assembly for joining wheels to a wheelchair. In particular, there is illustrated a pair of mounting assemblies, generally indicated at 124, for joining the rear wheels 116A and 116B to the laterally spaced side frames 112A and 112B of a wheelchair 110. The rear wheels 116A and 116B may include a hub (not shown) at the focal point of the wheels 116A and 116B. An axle 126 (shown in hidden line in FIG. 2) may extend inward substantially perpendicularly from the focal point of the hub of each wheel 116A and 116B. The term "focal point" is in reference to a central point or a point substantially at the center of the wheels 116A and 116B and the hub of each wheel 116A and 116B.

The axle 126 is coupled to an axle tube 128. The axle tube 128 may be in the form of a cross tube, such as the axle tube 128 shown, or a camber tube (not shown). Cross tubes generally have a linear axis. The term "linear" in this context is understood to mean substantially straight or along a substantially straight line. The axis of the cross tube is understood to be in reference to an imaginary line indicated along the line "A" through the center the cross tube (shown in FIG. 2). Unlike cross tubes, camber tubes are generally bent so as to support the wheels in a cambered position. The term "camber" is understood to mean a setting of the wheels 116A and 116B in which the top of the wheels 116A and 116B is closer together than the bottom of the wheels 116A and 116B, or vice versa. Cross tubes, unlike camber tubes, may support wheels 116A and 116B in a cambered or non-cambered position.

Now referring back to the drawings, there is illustrated an axle tube 128 that is preferably in the form of a generally rigid, elongate, laterally extending substantially cylindrical tube. The term "rigid" in this context means substantially non-flexible or stiff. The term "generally" may be construed liberally to allow for some flexibility in the axle tube 128. The term "elongate" is understood to mean having a length greater than its width. The axle tube 128 has a substantially cylindrical outer surface 136. The outer surface 136 is substantially cylindrical because the axle tube 128 shown is a substantially cylindrical tube. However, it should be understood that the geometry or surface shape or the physical arrangement of the axle tube 128 need not be cylindrical and that axle tubes having other shapes and forms may fall within the scope of the invention. The axle tube 128 may be a single tube having opposing ends, generally indicated at 132 and 134, as shown. A single axle tube may extend between and traverse the side frames 112A and 112B with the opposing ends 132 and 134 coupled or joined to the side frames 112A and 112B. Alternatively, each axle 126 (shown in hidden line in FIG. 2) may be supported by a separate axle tube (not shown) coupled to each side frame 112A and 112B. Although the axle tube 128 is coupled to the side frames 112A and 112B, it should be clearly understood that the term "side frame" may be broadly interpreted to generally mean the wheelchair frame 111. Hence, the axle tube 128 may be coupled to any portion of the wheelchair frame 111.

Figure 4:
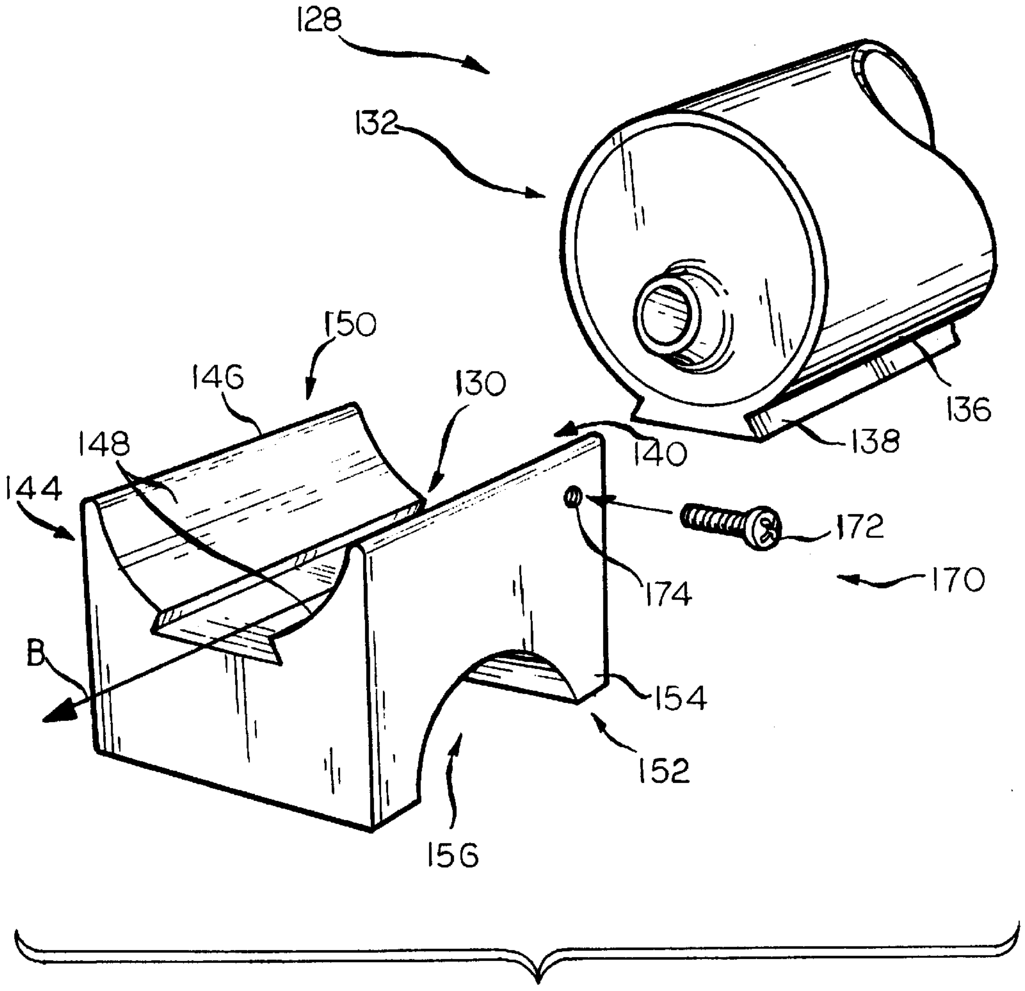
FIG. 4 is an exploded partial front and right side perspective view of the wheel mounting assembly shown in FIG. 1 and an axle tube.

One manner in which the axle tube 128 may be joined to the side frames 112A and 112B is best understood with reference to FIGS. 2 through 4. Each end 132 and 134 of axle tube 128, or in the case where separate axle tubes (not shown) are employed, each axle tube, may be joined to a respective side frame 112A and 112B in a similar manner. Hence, to simplify the description, the remaining portion of the description that follows will be directed toward a mounting assembly for joining one end 132 of the axle tube 128 to a corresponding or respective one of the side frames 112A. It should be clearly understood that the opposing end 134 of the axle tube 128 may be joined to the other side frame 112B with a similar mounting assembly.

Figure 7:
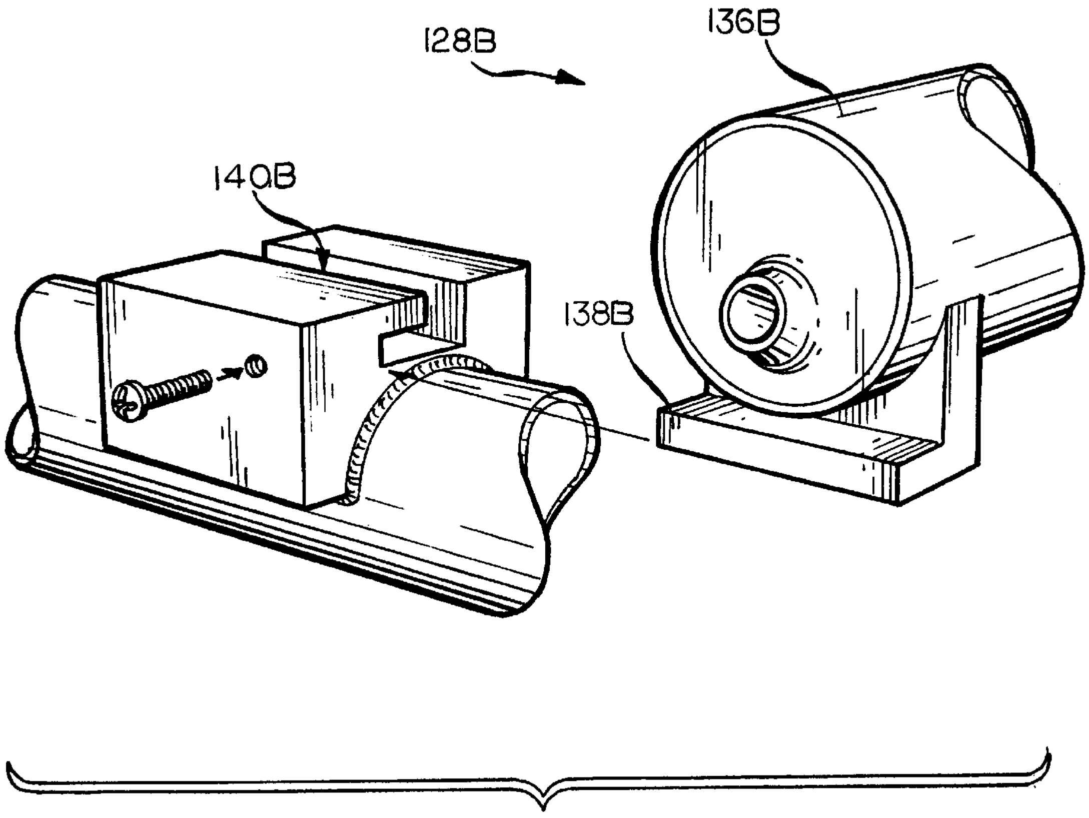
FIG. 7 is a partially exploded partial front and right side perspective view of another embodiment of the wheel mounting assembly.

Continuing with reference to the drawings, there is illustrated a projection 138 on the axle tube 128. "Projection" may be broadly interpreted to mean a thing or part that extends outward beyond a prevailing surface of the axle tube 128. A projection according to the invention preferably extends about a portion of the axle tube 128 and not entirely about the axle tube 128. The projection 138 may be in the form of a tongue or a protruding strip, such as the projection 138C shown in FIG. 8, along the outer surface 136C of the axle tube 128C. The projection 138 is most preferably in the form of a tenon, such as the rigid, laterally extending tenon shown. It is also preferable that the projection 138 be in the shape of a dovetail. The shape of the projection 138 shown characterizes a dovetail shape. However, projections of other shapes may fall within the scope of the invention. The projection 138 preferably extends from one end 132 of the axle tube 128 to the other end 134 of the axle tube 128. However, a separate projection on each of the opposing ends 132 and 134 of the axle tube 128 may be sufficient for carrying out the invention. An example of one such projection is shown 138B is shown in FIG. 7. In other words, the projection 138 need not extend entirely between the opposing ends 132 and 134 but rather may be discontinued between the opposing ends 132 and 134 so that the projection 138 is not on the axle tube 128 between the side frames 112A and 112B. In the event that separate axle tubes (not shown) are employed, a projection 138 may be on each axle tube. This should become more apparent in the description that follows, as it will become clear that a projection 138 need only be provided adjacent the side frames 112A and 112B. The term "adjacent" may be broadly interpreted to mean close or next to the side frames 112A and 112B. An advantage of having a projection 138 on the axle tube 128 that extends substantially without interruption between the opposing ends 132 and 134 of the axle tube 128 is that the mounting assembly 124 may readily join the axle tube 128 to the side frames 112A and 112B spaced various distances.

Figure 8:
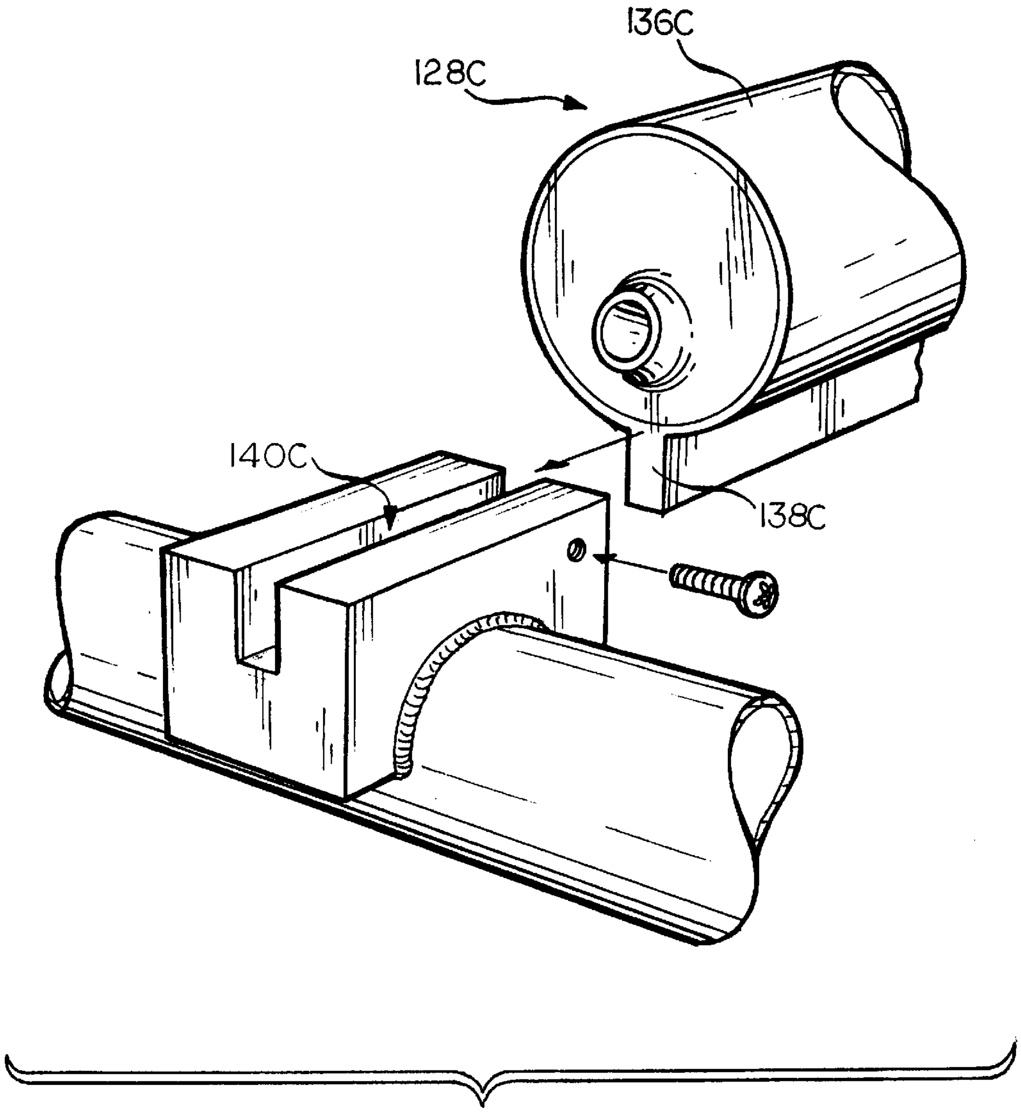
FIG. 8 is a partially exploded partial front and right side perspective view of another embodiment of the wheel mounting assembly.

The projection 138 is preferably engageable with an opening 140. The opening 140 is preferably shaped and dimensioned to receive the projection 138 to form a joint, generally indicated at 142 in FIGS. 2 and 3 whereby the axle tube cannot rotate relative to said body. For example, the projection 138 may be in the form of a tongue and the opening 140 may be in the form of a matching groove. The term "matching" in this context may be broadly interpreted to mean that the projection 138 and the opening 140 fit together or may be caused to fit together. An example of an opening 140C in the form of a matching groove is shown in FIG. 8. It is most preferable that the opening 140 be in the form of a mortise that is shaped and dimensioned to receive a tenon. The term "mortise" is intended to broadly define a captive opening or an opening that is shaped and dimensioned to trap or capture the projection 138. For example, the opening 140 may be in the shape of a dovetail to receive a dovetail shaped projection 138. A dovetail shaped opening 140 is characterized by the opening 140 shown in the drawings. The dovetail shaped projection 138 may be received in the dovetail shaped opening 140 by sliding the projection 138 into the opening 140, such as in a direction along the direction of the arrow B. Once in the opening 140, the projection 138 is captured or prevented from escaping from the opening 140 in a direction transverse to the direction of the arrow B.

Figure 6:
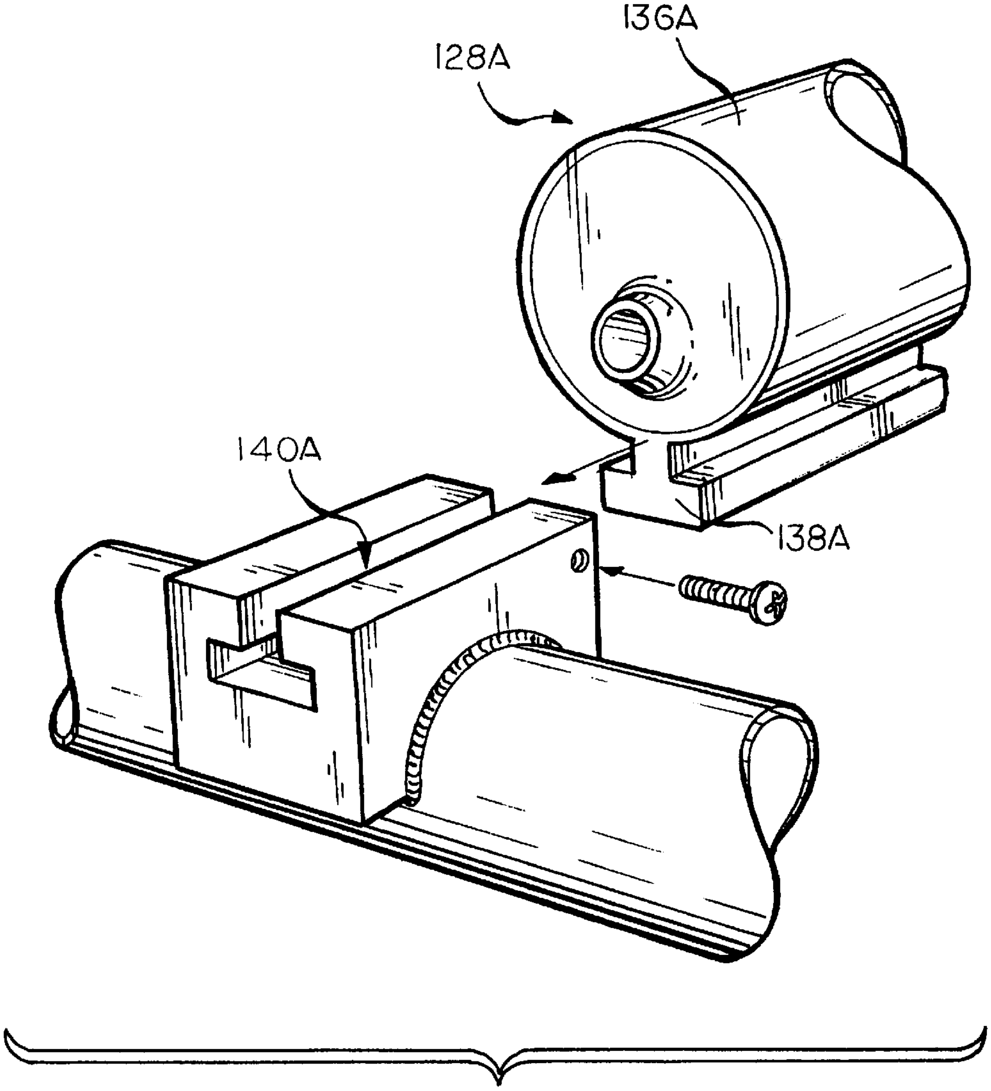
FIG. 6 is a partially exploded partial front and right side perspective view of another embodiment of the wheel mounting assembly.

Although a dovetail shaped projection 138 and opening 140 are preferred, it should be understood that other shaped projections and openings may fall within the scope of the invention. An example of an alternatively shaped projection 138A is shown in FIG. 6 along the outer surface 136A of the axle tube 128A. This projection 138A is a T-shaped projection. Another alternatively shaped projection 138B is shown in FIG. 7 along the outer surface 136B of the axle tube 128B. This projection 138B is an L-shaped projection. Alternatively shaped openings 140A and 140B, such as the T-shaped and L-shaped openings shown, may be provided for receiving these projections 138A and 138B.

Each side frame 112A and 112B supports an opening, generally indicated at 140, as is more clearly shown in FIG. 4. The manner in which each side frame 112A and 112B supports an opening 140 may be substantially the same. Hence, as stated above, the following description will be directed toward one of the side frames 112A and a manner in which an opening 140 may be supported by that side frame 112A. The side frame 112A may support the opening 140 in a number of ways. For example, a main or central part (hereinafter referred to as a body, generally indicated at 144) may define the opening 140 and the body 144 may be coupled to the side frame 112A. The body 144 preferably has an outer surface 146 and the opening 140 is preferably in the outer surface 146. The body 144 may be defined by a support having a seat 148, as is clearly shown in FIG. 4, upon which the axle tube 128 may rest. The term "support" in this context is in reference to substantially any structure capable of bearing the weight of the axle tube 128 or holding the axle tube 128 in position so as to keep the axle tube 128 from falling. It should be clearly understood that the axle tube 128 may be positioned above or below the side frame 112A. The body 144 is most preferably in the form of a rigid, rectangular shaped base. The term "base" in this context is in reference to the body 144 being substantially the lowest or bottom part or the basic underlying element of the mounting assembly 124. The body 144 preferably has an upper end, generally indicated at 150, and a lower end, generally indicated at 152. A carriage, generally indicated at 130, as is clearly shown in FIG. 4, may be formed by the upper end 150 of the body 144. The term "carriage" may be broadly interpreted to mean a movable part for holding or shifting the location of the axle tube 128.

The mounting assembly may include a retainer, generally indicated at 170, as shown in FIG. 4. The term "retainer" may be broadly interpreted as a device that restrains or holds the axle tube 128 in a particular place or position. The retainer 170 most preferably holds the axle tube 128 in a position relative to the body 144 so that the axle tube 128 is prevented from moving laterally relative to the body 144. The retainer 170 may be in many forms in the direction of the arrow B or in a direction opposite to the direction of the arrow B. The retainer 170 may include a setscrew 172 that may be threadably engageable with a hole 174 in the body 144. The hole 174 in the body 144 may coalign with a portion of the axle tube 128 or a portion of the projection 138. The setscrew 172 may be threaded into the hole 174 to contact the axle tube 128 or the projection 138 to hold the axle tube 128 or projection 138 in place. It should be understood that the retainer 170 shown is provided for illustrative purposes and that other retainers may fall within the scope of the invention.

It should be clearly understood that the body 144 may be joined to the side frame 112A so as to permit the side frame 112A to support the opening 140. This may be accomplished in a number of ways. One manner in which the body 144 may be joined to the side frame 112A is set forth as follows. The lower end 152 of the body 144 may define an upper clamp part 154 having a saddle, generally indicated at 156, shaped and dimensioned to receive a portion of the wheelchair side frame 112A. A lower clamp part 158 may be removably attachable to the upper clamp part 154 to form a clamp, indicated generally at 160, as shown in FIGS. 2 and 3. The term "removably" in this context is intended to be broadly interpreted to mean that the lower clamp part 158 can be readily removed from the upper clamp part 154, with or without the aid of tools (not shown). The term "readily" may be interpreted liberally to mean promptly or in a prompt, timely manner or in manner indicating or connoting ease. The lower clamp part 158 may similarly have a saddle, generally indicated at 162, shaped and dimensioned to receive a portion of the wheelchair side frame 112A. The term "saddle" may be understood to mean a support shaped to fit the wheelchair side frame 112A. For example, the upper and lower clamp parts 154 and 158 may have semi-cylindrical saddles, as shown in the drawings, that, when attached together, form a cylindrical support shaped to fit a cylindrical portion of the side frame 112A. The clamp 160 is adjustable for bracing the body 144 to the wheelchair side frame 112A. This may be accomplished by inserting threaded fasteners 164 (shown in hidden line in FIG. 3), such as a hex cap screw, into holes 166 (shown in hidden line in FIG. 3) in the lower clamp part 158 and threading the fasteners 164 into coaligning, internally threaded holes 168 (also shown in hidden line in FIG. 3) in the body 144. Although only one clamp 160 is described above, it should be clearly understood that a pair of clamps 160 may be used to couple a pair of bodies 144 to the opposing wheelchair side frames 112A and 112B.

It should also be understood that the invention is not intended to be limited to include a coupling, such as the clamp 160 shown. Any of various devices with opposing, adjustable sides or parts may be used for bracing the body 144 to the side frame 112A and holding the body 144 and the side frame 112A together. It should further be understood that the invention is not limited to the clamp 160 described above and that other couplings may be suitable for coupling the body 144 to the wheelchair side frame 112A.

Figure 5:
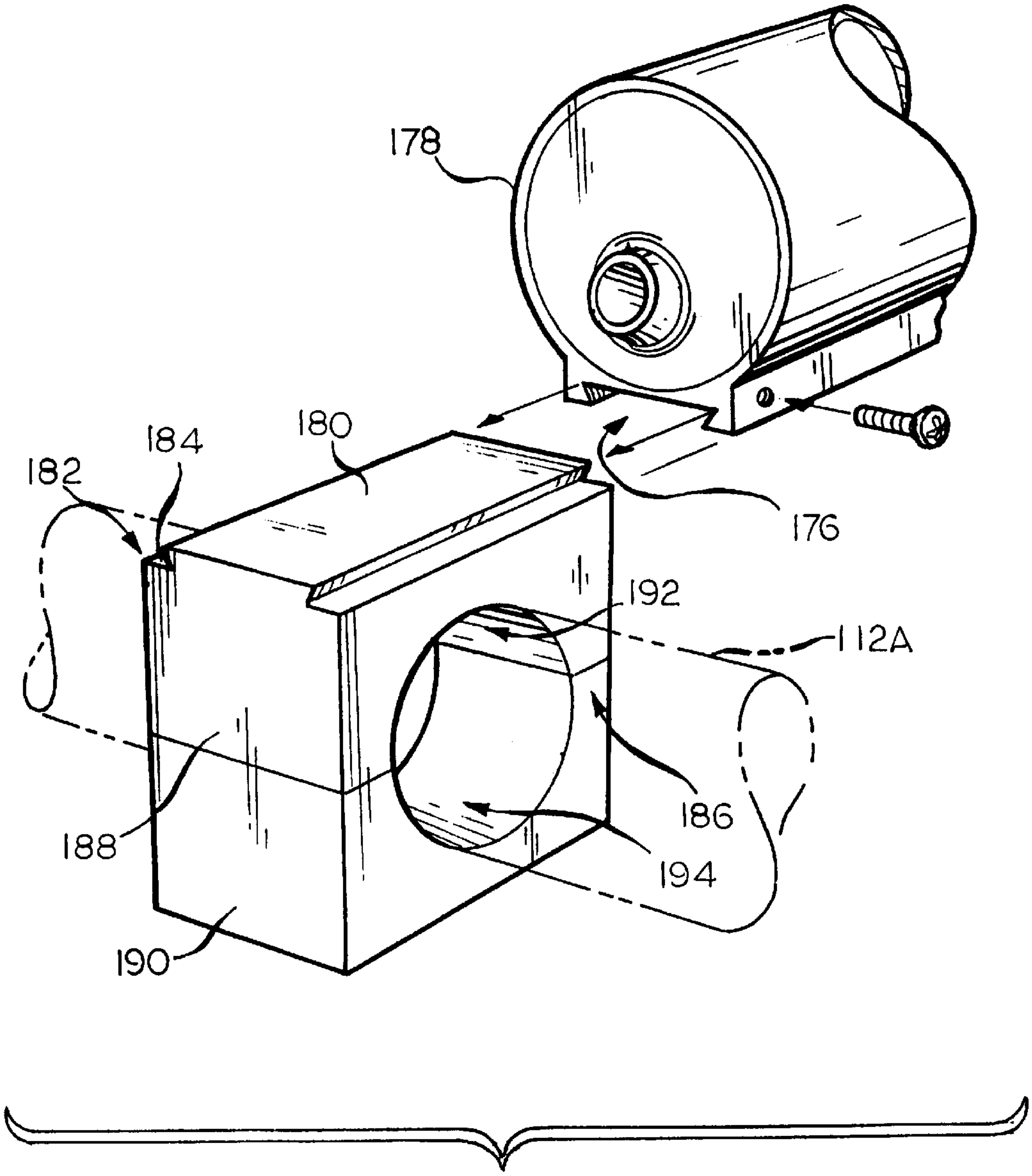
FIG. 5 is a partially exploded partial front and right side perspective view of another embodiment of the wheel mounting assembly.

It should further be understood that the mounting assembly may comprise an opening, generally indicated at 176, defined by an axle tube 178 and a projection 180 on the side frame 112A, as is shown in FIG. 5. The opening 176 on the axle tube 178 may likewise be shaped and dimensioned to receive the projection 180 on the side frame 112A. The projection 180 may be in the form of a tongue or a dovetail shaped tenon and the opening 176 may respectively be in the form of a matching groove or a mortise having a mating dovetail shape.

It should be understood that the projection 180 may be directly on the side frame 112A or may be on a body 182 that may be joined to the side frame 112A. For example, the projection 180 may be on the outer surface 184 of the body 182. The body 182 may in turn be joined to the side frame 112A. The term "body" in this context is not limited to the body 182 shown in the drawings but rather may include any part suitable for supporting the projection 180. Moreover, the projection 180 may be affixed directly to the side frame 112A, such as by welding, or may be formed, shaped or molded on the side frame 112A or as a part of the structure forming the side frame 112A.

There is an advantage in having a projection 180 on a body separate and apart from the side frame 122A. The position of the body 182 may be adjusted relative to the side frame 112A. This may be accomplished by coupling the body 182 to the side frame 112A by a coupling, such as the coupling 186 shown. The coupling 186 may be similar to the clamp 160 described above, having first and second clamp parts 188 and 190. The first clamp part 188 may be defined by the lower end (shown but not referenced) of the body 182. The second clamp part 190 may be removably attachable to the first clamp part 188 in a manner similar to the manner in which the above-described upper and lower clamp parts 154 and 158 are attached. The first and second clamp parts may be adjustable relative to one another for bracing the body 182 to the side frame 112A. The first and second clamp parts may each further have a saddle 192 and 194 shaped and dimensioned to receive a portion of the side frame 112A. The saddles 192 and 194 may be similar to the saddles 156 and 162 described above.

In accordance with the provisions of the patent statutes, the principle and mode of operation of the inventions have been explained and illustrated in their preferred embodiments. However, it must be understood that the inventions may be practiced otherwise than as specifically explained and illustrated without departing from their spirit or scope.

What is claimed is:

1. A mounting assembly for joining a wheel to a wheelchair frame, comprising:

an axle tube having a projection thereon;

a body having an opening therein, said opening being shaped and dimensioned to receive said projection to form a joint whereby said axle tube cannot rotate relative to said body; and a coupling for coupling said body to the wheelchair frame.

2. The mounting assembly according to claim 1, wherein said body defines a first clamp part, said first clamp part being removably attachable to a second clamp part to form said coupling, said first and second clamp parts being adjustable relative to one another for adjustably bracing said body to the wheelchair frame.

3. The mounting assembly according to claim 2, wherein said first and second clamp parts each have a saddle shaped and dimensioned to receive a portion of the wheelchair frame.

4. The mounting assembly according to claim 1, wherein said projection is a tongue and said opening is a matching groove.

5. The mounting assembly according to claim 1, wherein said body is defined by a support having a seat upon which said axle tube may rest.

6. The mounting assembly according to claim 5, wherein said support defines a first clamp part, said first clamp part being removably attachable to a second clamp part, said first and second clamp parts being adjustable relative to one another for bracing said support to the wheelchair frame.

7. The mounting assembly according to claim 6, wherein said first and second clamp parts each have a saddle shaped and dimensioned to receive a portion of the wheelchair frame.

8. The mounting assembly according to claim 1, wherein said projection is a T-shaped projection and said opening is a matching T-shaped opening.

9. The mounting assembly according to claim 1, wherein said projection is a L-shaped projection and said opening is a matching L-shaped opening.

10. The mounting assembly according to claim 4, wherein said tongue is a rectangular-shaped tongue and said groove is a matching rectangular-shaped groove.

11. An apparatus for joining an axle tube to a wheelchair frame, comprising:

a tube having a projection thereon, said projection being a rigid, laterally extending tenon;

a body having an outer surface and an opening in said outer surface, said opening being shaped and dimensioned to receive said projection to form a joint, said opening further being a mortise, said tenon and said mortise being in the shape of a dovetail; and a coupling for coupling said body to a wheelchair frame.

12. The apparatus according to claim 11, wherein said body is defined by a base having an upper end and a lower end, said upper end forming a carriage having a seat upon which the axle tube may rest, said mortise being in said upper end of said base.

13. The apparatus according to claim 12, wherein said base defines a first clamp part, said first clamp part being removably attachable to a second clamp part, said first and second clamp parts being adjustable relative to one another for bracing said base to the wheelchair side frame.

14. The apparatus according to claim 12, wherein said first and second clamp parts each have a saddle shaped and dimensioned to receive a portion of the wheelchair frame.

15. The apparatus according to claim 13, wherein said base is rigid and rectangular in shape.

16. A mounting assembly for joining an axle tube to a wheelchair frame, comprising:

a body having an outer surface and a projection on said outer surface;

an axle tube defining an opening, said opening being shaped and dimensioned to receive said projection to form a joint whereby said axle tube cannot rotate relative to said body; and a coupling for coupling said body to the wheelchair frame.

17. The mounting assembly according to claim 16, wherein said body defines a first clamp part, said first clamp part being removably attachable to a second clamp part, said first and second clamp parts being adjustable relative to one another for bracing said body to the wheelchair frame.

18. The apparatus according to claim 17, wherein said first and second clamp parts each have a saddle shaped and dimensioned to receive a portion of the wheelchair frame.

19. The mounting assembly according to claim 16, wherein said projection is a tongue and said opening is a matching groove.

20. The mounting assembly according to claim 19, wherein said tongue is a rectangular-shaped tongue and said groove is a matching rectangular-shaped groove.

21. An apparatus for joining an axle tube to a wheelchair frame, comprising:

a body having an outer surface and a projection on said outer surface, said projection being a rigid, laterally extending tenon;

a tube defining an opening, said opening being shaped and dimensioned to receive said projection to form a joint, said opening further being a mortise, said tenon and said mortise having mating dovetail shapes; and a coupling for coupling said body to a wheelchair frame.

22. A mounting assembly for joining a wheel to a wheelchair frame, comprising:

an axle tube having an outer surface and a tongue on said outer surface of said axle tube;

a support having a seat upon which said axle tube may rest and a groove shaped and dimensioned to receive said tongue to form a joint between said axle tube and said support, said support defining a first clamp part; and a second clamp part being removably attachable to said first clamp part so as to form a clamp, said first and second clamp parts each having a saddle shaped and dimensioned to receive a portion of the wheelchair frame, said clamp being adjustable relative to the wheelchair frame.

23. An apparatus for joining wheels to a wheelchair having laterally spaced side frames, said apparatus comprising:

a rigid, elongate, laterally extending, cylindrical axle tube having opposite ends and an outer cylindrical surface;

a rigid, laterally extending tenon on said outer cylindrical surface of said axle tube, said tenon extending from one said end of said axle tube to the other said end of said axle tube, said tenon having a dovetail shape;

a pair of rigid, rectangular shaped bases, each said base having an upper end and a lower end, said upper end of each said base forming a carriage having a seat upon which said axle tube may rest and a mortise shaped and dimensioned to receive said tenon to form a joint between said axle tube and each said base, said lower end of each said base defining an upper clamp part having a saddle shaped and dimensioned to receive a portion of a respective one of the wheelchair side frames; and a pair of lower clamp parts, each said lower clamp part having a saddle shaped and dimensioned to receive a portion of a respective one of the wheelchair side frames, each said lower clamp part being removably attachable to said upper clamp part of a respective one of said bases so as to form a pair of clamps, each said clamp being adjustable for bracing each said base to a respective one of the wheelchair side frames.

24. A wheelchair comprising:

a frame;

an axle tube;

a projection on said axle tube, said projection extending about a portion of said axle tube and not entirely about said axle tube;

a body coupled to said frame, said body having an outer surface and an opening in said outer surface supported by said frame, said opening being shaped and dimensioned to receive said projection to form a joint between said axle tube and said body.

25. A mounting assembly for joining wheels to a wheelchair frame, comprising:

an axle tube having opposite ends;

a body adapted to be supported by the wheelchair frame;

a projection on said axle tube, said projection extending from one said end of said axle tube to the other said end of said axle tube; and an opening in said body, said opening being shaped and dimensioned to receive said projection to form a joint.

* * * * *